(12) United States Patent
Gopalakrishnan et al.

(10) Patent No.: US 12,349,100 B2
(45) Date of Patent: Jul. 1, 2025

(54) SIMILARITY LEARNING FOR CROWD-SOURCED POSITIONING

(71) Applicant: QUALCOMM Incorporated, San Diego, CA (US)

(72) Inventors: Sooryanarayanan Gopalakrishnan, San Diego, CA (US); Jay Kumar Sundararajan, San Diego, CA (US); Taesang Yoo, San Diego, CA (US); Naga Bhushan, San Diego, CA (US); Guttorm Ringstad Opshaug, Redwood City, CA (US); Grant Marshall, Campbell, CA (US); Chandrakant Mehta, Cupertino, CA (US); Zongjun Qi, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/932,174

(22) Filed: Sep. 14, 2022

(65) Prior Publication Data
US 2024/0089905 A1 Mar. 14, 2024

(51) Int. Cl.
*H04W 64/00* (2009.01)
*G01S 5/02* (2010.01)
*H04W 24/08* (2009.01)

(52) U.S. Cl.
CPC ....... *H04W 64/003* (2013.01); *G01S 5/02526* (2020.05); *H04W 24/08* (2013.01)

(58) Field of Classification Search
CPC ... H04W 64/003; H04W 24/08; H04W 64/00; G01S 5/02526; G01S 5/0278; G06N 3/045; G06N 3/08
See application file for complete search history.

(56) References Cited

U.S. PATENT DOCUMENTS 10,145,962 B1\* 12/2018 Nikkhah .............. G01S 19/252
2011/0098003 A1\* 4/2011 Hahm .................. H04B 1/7115
455/63.1

(Continued)

FOREIGN PATENT DOCUMENTS

WO 2022081510 A1 4/2022
WO 2022135693 A1 6/2022

OTHER PUBLICATIONS

International Search Report and Written Opinion—PCT/US2023/029036—ISA/EPO—Oct. 20, 2023.

(Continued)

*Primary Examiner* — Santiago Garcia
(74) *Attorney, Agent, or Firm* — Procopio, Cory, Hargreaves & Savitch LLP/Qualcomm

(57) ABSTRACT

Aspects presented herein may enhance the accuracy and/or latency of UE positioning based on crowd-sourcing, where a network entity may compute a position estimate of a UE based on neighbor-cell scan data from the UE and one or more reference UEs. In one aspect, a network entity receives a first set of measurements associated with at least one cell from a UE. The network entity performs a position estimation of the UE based on at least one of the first set of measurements associated with the at least one cell, a second set of measurements for each of a set of reference UEs, or a location of each of the set of reference UEs via an ML model, where the UE and the set of reference UEs include at least one common cell.

30 Claims, 11 Drawing Sheets

(56) References Cited

U.S. PATENT DOCUMENTS

| | | | | |
|---|---|---|---|---|
| 2011/0117925 | A1* | 5/2011 | Sampath | H04W 4/029 |
| | | | | 455/456.1 |
| 2015/0334678 | A1* | 11/2015 | MacGougan | H04W 4/02 |
| | | | | 701/451 |
| 2016/0029368 | A1* | 1/2016 | Borenstein | H04W 72/563 |
| | | | | 709/205 |
| 2016/0227379 | A1* | 8/2016 | Arastafar | H04W 64/00 |
| 2019/0107396 | A1* | 4/2019 | Tan | H04B 17/27 |
| 2020/0250561 | A1 | 8/2020 | Restrepo Conde | |
| 2020/0413189 | A1* | 12/2020 | Baughman | G05D 1/0094 |
| 2021/0089134 | A1 | 3/2021 | Tran | |
| 2021/0105794 | A1 | 4/2021 | Luomi et al. | |
| 2022/0046386 | A1 | 2/2022 | Sundararajan et al. | |
| 2022/0095078 | A1 | 3/2022 | Nurminen et al. | |
| 2022/0141637 | A1* | 5/2022 | Pellegrini | H04W 4/12 |
| | | | | 455/404.1 |
| 2022/0360963 | A1* | 11/2022 | Ferentz | H04W 4/90 |
| 2022/0366494 | A1* | 11/2022 | Cella | H04L 9/50 |
| 2023/0066525 | A1* | 3/2023 | Cabanas | H04W 4/029 |
| 2024/0163829 | A1* | 5/2024 | Fakoorian | H04W 64/00 |

OTHER PUBLICATIONS

Qualcomm Incorporated: "Other Aspects on AI-ML for Positioning Accuracy Enhancement", 3GPP TSG RAN WG1 #110, R1-2207229, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 16 Pages, XP052275165, Para [4RFfingerprinting], chapters 4 and 5.

* cited by examiner

SIMILARITY LEARNING FOR CROWD-SOURCED POSITIONING

TECHNICAL FIELD

The present disclosure relates generally to communication systems, and more particularly, to a wireless communication involving crowd-sourced positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a first set of measurements associated with at least one cell from a user equipment (UE). The apparatus performs a position estimation of the UE based on at least one of the first set of measurements associated with the at least one cell, a second set of measurements for each of a set of reference UEs, or a location of each of the set of reference UEs via at least one machine learning (ML) model, where the UE and the set of reference UEs include at least one common cell, where the at least one ML model is capable of identifying the at least one common cell between the UE and the set of reference UEs, and where an output of the at least one ML model includes a similarity score between the UE and the set of reference UEs.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
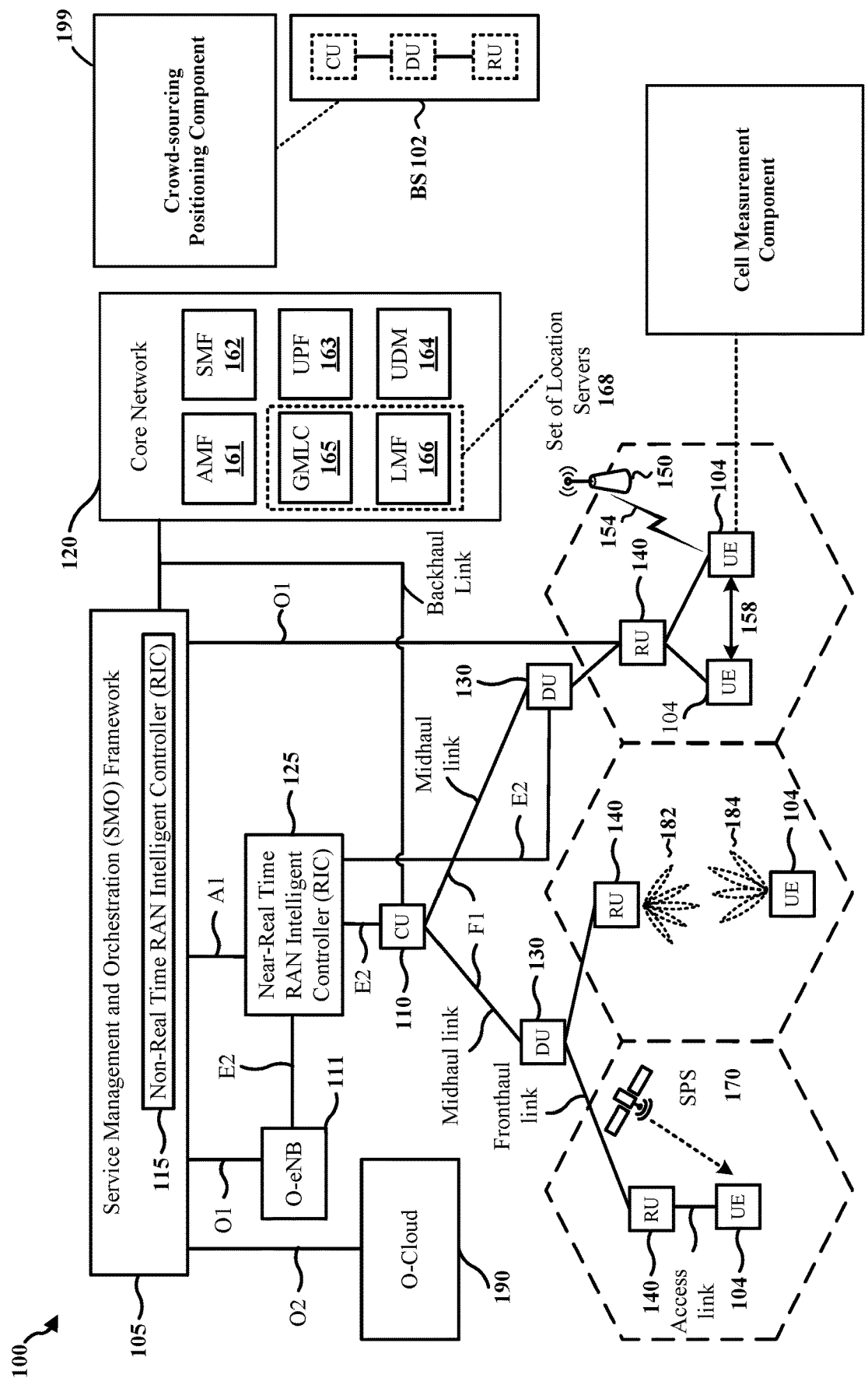
FIG. 1 is a diagram illustrating an example of a wireless communications system and an access network.

Aspects presented herein may enhance the accuracy and/or latency of UE positioning based on crowd-sourcing. Aspects presented herein provides a mechanism for a server (e.g., the server 502) to compute a position estimate of a target device (e.g., the target device 506) based on neighbor-cell scan data. In one aspect of the present disclosure, the position estimation of the target device based on neighbor-cell scan data (e.g., the mapping of neighbor-cell scan data to a position) may depend on one or more of: physics (e.g., reference signal received power (RSRP) inversely related to range), cell characteristics (e.g., down-tilt, transmission (Tx) power, antenna array structure, etc.), the device type (e.g., IoT devices comparing to smartphones may have different antenna characteristics), and/or the environment (e.g., environmental conditions) surrounding the target device (e.g., terrain, blockages, building materials, etc.). In another aspect of the present disclosure, an artificial intelligence (AI) or machine learning (ML) framework may be implemented at the server for estimating the position of the target device, such as an IoT user. As such, the position estimate of the target device may be a function of locations of one or more reference UEs and/or cells scanned by the target device. In other words, the position of the target device may be determined based on a learned "similarity" between the reference UEs/cells and the target device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include dis aggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects the base station 102 may be configured to receive a first set of measurements associated with at least one cell from a UE; and perform a position estimation of the UE based on at least one of the first set of measurements associated with the at least one cell, a second set of measurements for each of a set of reference UEs, or a location of each of the set of reference UEs via at least one ML model, where the UE and the set of reference UEs include at least one common cell, where the at least one ML model is capable of identifying the at least one common cell between the UE and the set of reference UEs, and where an output of the at least one ML model includes a similarity score between the UE and the set of reference UEs (e.g., via the crowd-sourcing positioning component 199).

Figure 2:
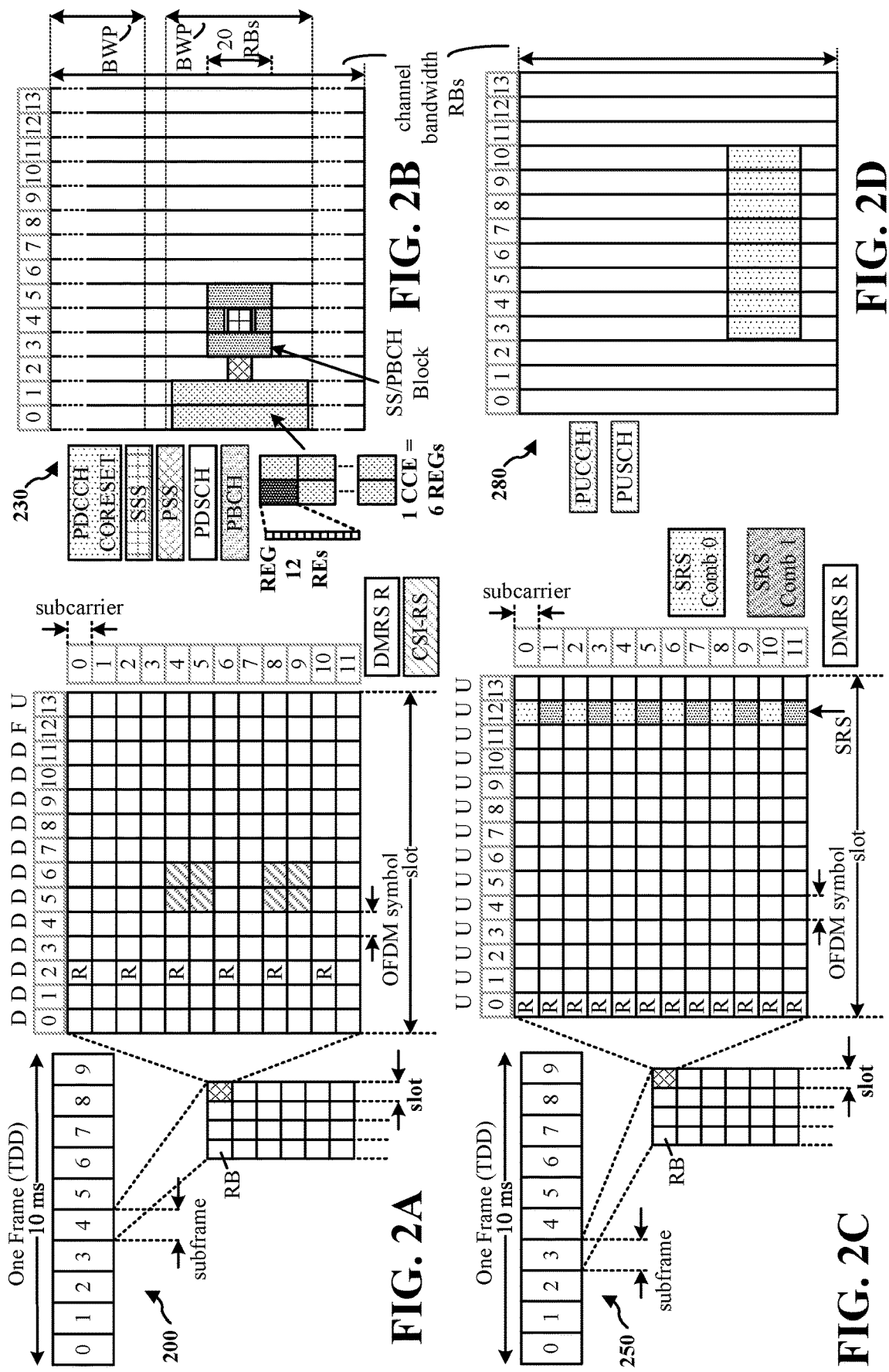
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
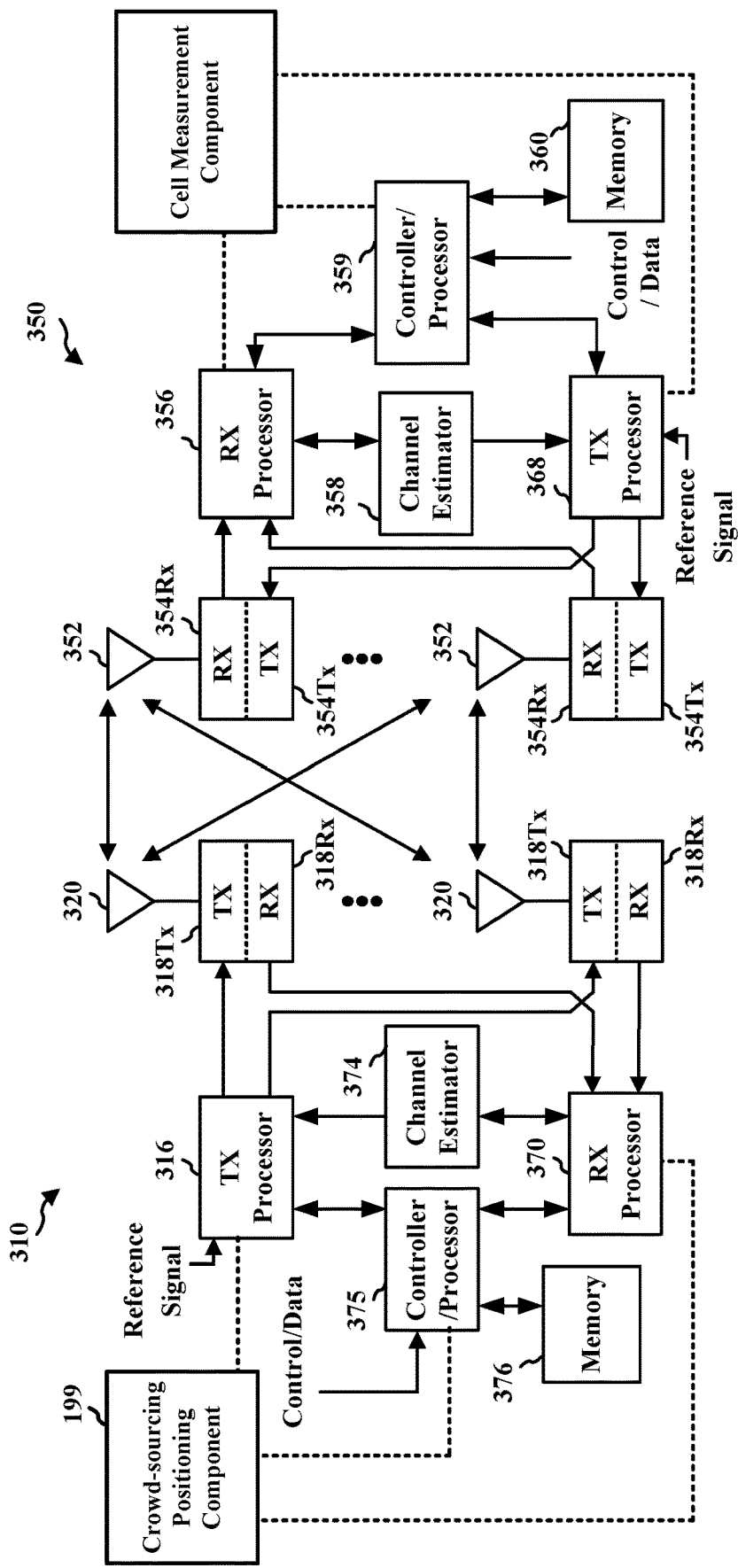
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the crowd-sourcing positioning component 199 of FIG. 1.

Figure 4:
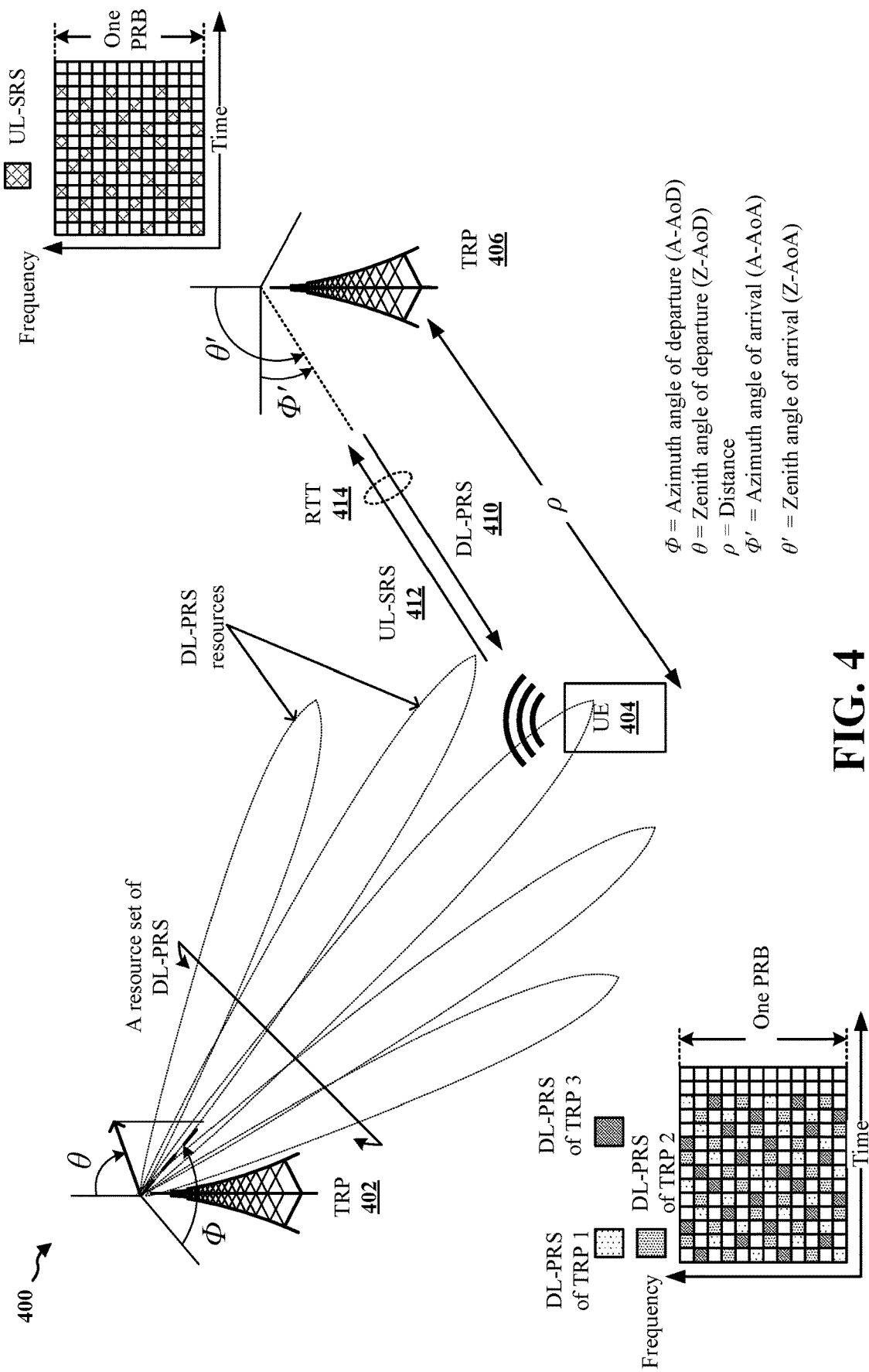
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some scenarios, the position of a UE (e.g., an internet of things (IoT) device) may be determined (e.g., by the UE or a positioning server) based on crowd-sourced information (or crowd-sourcing). Crowdsourcing may refer to a mechanism for collecting information (which may be referred to as "crowd-sourcing information") from a group of UEs, usually via an online server. For example, crowdsourcing may involve obtaining data such as radio frequency (RF) measurements, sensing information (e.g., information obtained via one or more sensors), and/or location information from a group of UEs, where the group of UEs may submit the data to a crowd-sourcing server or an Internet platform (e.g., social medias, mobile applications, etc.). Based on the data collected from the group of UEs, the crowd-sourcing server may aggregate the data, analyze the data, and determine which set(s) of data may be useful or has good credibility to other devices. For example, a crowd-sourcing server may collect weather conditions reported by a group of UEs within a region in real time. Based on the weather conditions received from the group of UEs, the crowd-sourcing server may be able to determine the current weather condition at that region, and the crowd-sourcing server may share such the determined weather condition with other UEs (e.g., UEs that are in proximity to the region or moving towards the region).

Figure 5:
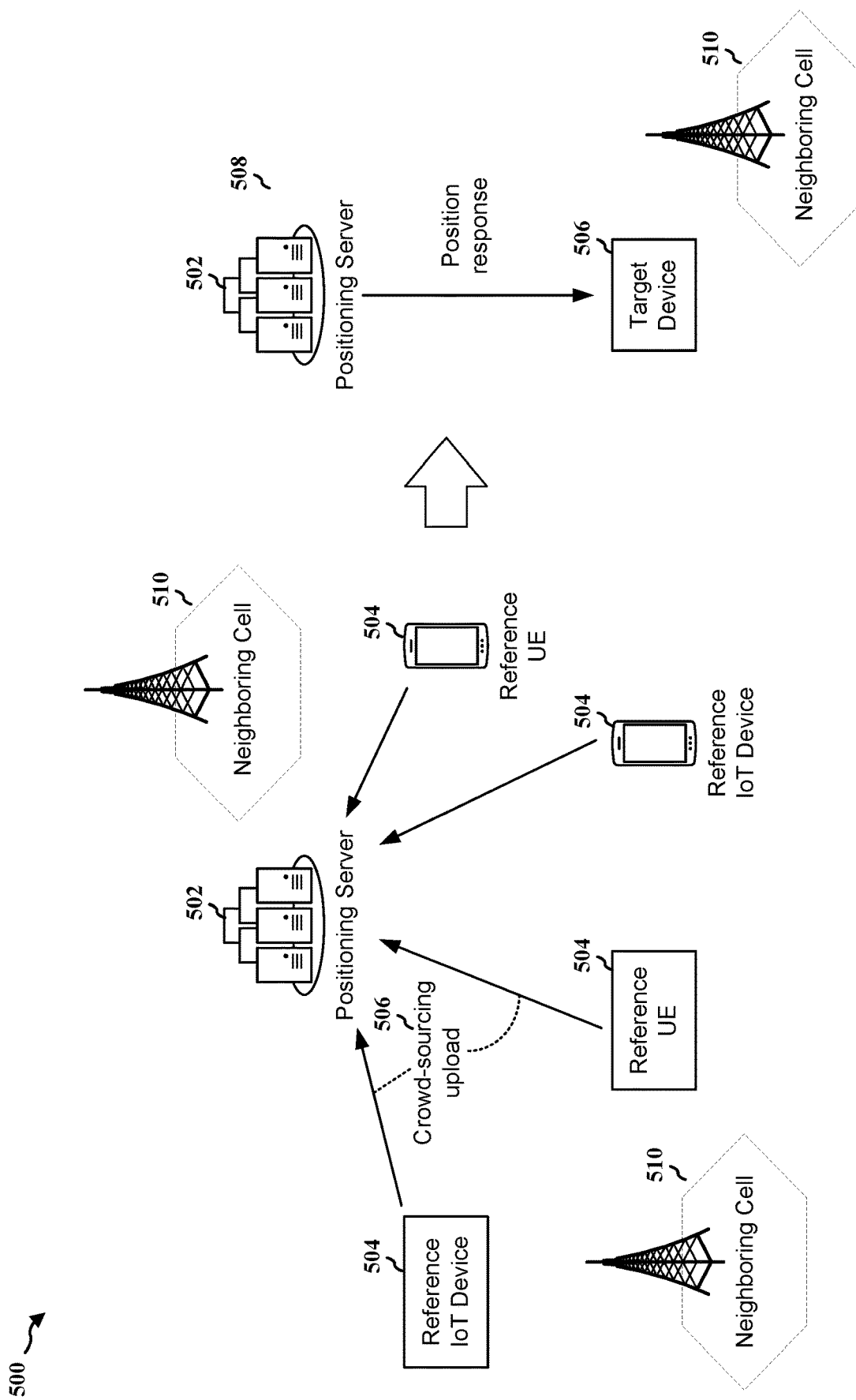
FIG. 5 is a diagram illustrating an example of determining a position of a target device based on crowd-sourcing in accordance with various aspects of the present disclosure.

FIG. 5 is a diagram 500 illustrating an example of determining a position of a target device based on crowd-sourcing in accordance with various aspects of the present disclosure. Certain UEs, such as IoT devices, may have a low-power positioning specification, where these UEs may specify a positioning accuracy that is typically tens (10s) of meters to a few hundreds (100s) of meters. For example, UEs used in association with asset tracking, such as a tracker device for a shipping container, may specify a lower positioning accuracy compared to UEs that are used for real-time navigation.

In one example, the position of a device (which may be referred to as a target device) may be accomplished by means of crowd-sourcing. For example, as shown at 506, a set of UEs 504 (which may also be referred to as reference UEs and/or reference IoT devices) may be configured to scan/measure one or more neighboring cells 510, such as measuring the reference signal received power (RSRP) of the one or more neighboring cells 510. Then, the set of UEs 504 may upload their measurements (e.g., RSRP) to a server 502 (e.g., a crowd-sourcing server or a positioning server).

The server 502 may analyze and aggregate the scan data/measurements from the set of UEs 504 along with their known positions. The server 502 may be associated with a network node, such as a base station or a component of a base station. For purposes of the present disclosure, a reference UE may refer to a UE with a known location that is able to provide measurements for one or more cells (e.g., RSRP measurements), such that an entity (e.g., a server or a base station) may use the UE's measurement and location as a reference to determine the location of another UE (e.g., a target device/UE). Similarly, a reference cell may refer to a cell (or a base station/TRP) with a known location that is able to serve as a reference to determine the location of a UE.

Then, as shown at 508, when the server 502 is requested to determine the position of a target device 506 (e.g., a device that has a lower positioning accuracy specification), the server 502 may request scan data/measurements (e.g., RSRP) from the target device 506 for one or more neighboring cells surrounding the target device 506 (or the target device 506 may send the scan data/measurements to the server 502 for position determination without receiving a request from the server 502). Based on the server 502's crowd-sourced information, the server 502 may estimate the position of the target device 506, such as by comparing the similarities between the scan data/measurements from the target device 506 with the scan data/measurements from the set of UEs 504. For example, if there is a high similarity between the scan data/measurements from the target device 506 with the scan data/measurements from one UE in the set of UEs 504, then it is likely that the target device 506 is in proximity to this UE.

Aspects presented herein may enhance the accuracy and/or latency of UE positioning based on crowd-sourcing. Aspects presented herein provides a mechanism for a server (e.g., the server 502) to compute a position estimate of a target device (e.g., the target device 506) based on neighbor-cell scan data. In one aspect of the present disclosure, the position estimation of the target device based on neighbor-cell scan data (e.g., the mapping of neighbor-cell scan data to a position) may depend on one or more of: physics (e.g., RSRP inversely related to range), cell characteristics (e.g., down-tilt, transmission (Tx) power, antenna array structure, etc.), the device type (e.g., IoT devices comparing to smartphones may have different antenna characteristics), and/or the environment (e.g., environmental conditions) surrounding the target device (e.g., terrain, blockages, building materials, etc.). In one example, position estimation of a target device (e.g., a UE) may refer to calculating an approximate location/position of the target device, such as using one of the positioning mechanisms described in connection with FIG. 4.

In another aspect of the present disclosure, an artificial intelligence (AI) or machine learning (ML) framework may be implemented at the server for estimating the position of the target device, such as an IoT user. As such, the position estimate of the target device may be a function of locations of one or more reference UEs and/or cells scanned by the target device. In other words, the position of the target device may be determined based on a learned "similarity" between the reference UEs/cells and the target device.

The speed, bandwidth, latency, and reliability of wireless communications (and network-based positioning) have advanced significantly over last few decades, which also increased the complexity of deploying a wireless network in some instances. To improve management of various network nodes and functions, operators and vendors of wireless communication have started to employ artificial intelligence and machine learning (AI/ML) to their services. In one example, AI may be broadly defined as configuring computers/electronics devices to perform tasks regarded as uniquely human. ML may be one category of AI techniques, which include algorithms that are capable of automatically improving their performance without explicit programming.

In some examples, ML algorithms may include supervised learning, unsupervised learning, and/or reinforcement learning. Under the supervised learning, an ML model may specify labelled input and output data during the training phase of the ML. This training data is often labelled by a data scientist in the preparation phase, before being used to train and test the ML model. Once the ML model has learned the relationship between the input and output data, it can be used to classify new and unseen datasets and predict outcomes. Under the unsupervised learning, an ML model may be trained based on raw and unlabeled training data, where the ML model is often used to identify patterns and trends in raw datasets, or to cluster similar data into a specific number of groups. Unsupervised machine learning may be more of a hands-off approach compared to the supervised learning, where the ML model may be configured to process huge arrays of data effectively without human oversight. Under the reinforcement learning, an ML model may be trained based on rewarding suitable behaviors and/or punishing unsuitable behaviors. For example, positive values may be assigned to the suitable actions to encourage the ML model and negative values may be assigned to unsuitable behaviors. This may enable the ML model to seek long-term and maximum overall reward to achieve an optimal solution. ML models are often associated with neural networks (NNs), which may also be known as artificial neural networks (ANNs) or simulated neural networks (SNNs). A neural network may refer to a computer architecture in which a number of processors are interconnected in a manner suggestive of the connections between neurons in a human brain and which is able to learn by a process of trial and error.

For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode. On the other hand, a "training" or an "ML training" may refer to a process of running data points to train or teach an ML model (e.g., via a training host). A "training host" or an "ML training host" may refer to a network function which hosts the ML model during a training mode.

Figure 6:
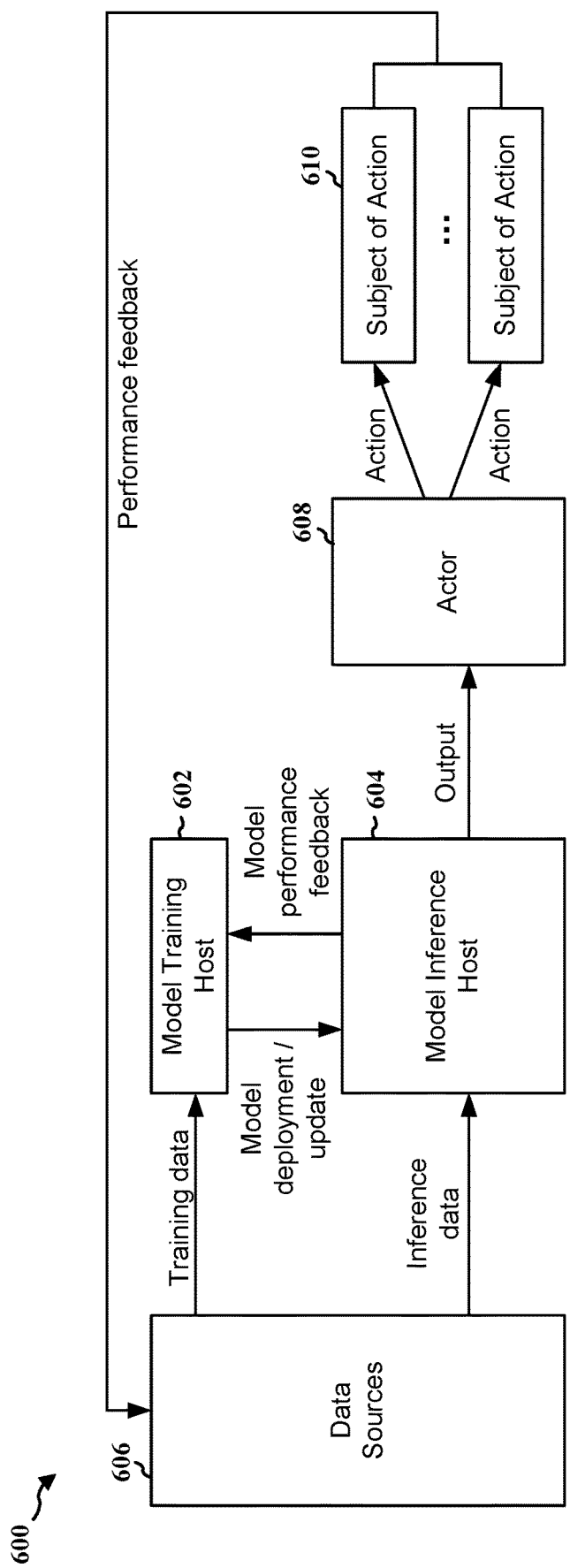
FIG. 6 is a diagram illustrating an example architecture of a functional framework associated with a machine learning (ML) model in accordance with various aspects of the present disclosure.

FIG. 6 is a diagram 600 illustrating an example architecture of a functional framework associated with an ML model in accordance with various aspects of the present disclosure. In some scenarios, the functional frame work for an ML model may be enabled by further enhancement of data collection through uses cases and/or examples. In one example, as shown by the diagram 600, a functional framework for the ML model may include multiple logical entities, such as a model training host 602, a model inference host 604, data sources 606, and/or an actor 608, etc. In some examples, multiple logical entities may be co-located on the same device (e.g., a UE, a positioning device, etc.) or a network node (e.g., a base station, a component of the base station, a server, etc.). In other examples, different logical entities may be located at different devices or network nodes.

The model inference host 604 may be configured to run an ML model based on inference data provided by the data sources 606, and the model inference host 604 may produce an output (e.g., a prediction) with the inference data input to the actor 608. The actor 608 may be a device or an entity. For example, the actor 608 may be a GNSS device or a location server associated with the GNSS device, etc. In addition, the actor 608 may also depend on the type of tasks performed by the model inference host 604, type of inference data provided to the model inference host 604, and/or type of output produced by the model inference host 604, etc.

After the actor 608 receives an output from the model inference host 604, the actor 608 may determine whether or how to act based on the output. For example, if the actor 608 is a location server and the output from the model inference host 604 is associated with RSRP measurement classification, the actor 608 may determine how to classify one or more RSRP measurements performed based on the output. Then, the actor 608 may indicate the classification to at least one subject of action 610. In some examples, the actor 608 and the at least one subject of action 610 may be the same entity (e.g., the UE).

The data sources 606 may also be configured for collecting data that is used as training data for training the ML model or as inference data for feeding an ML model inference operation. For example, the data sources 606 may collect data from one or more UEs, base stations, or location servers, which may include the subject of action 610, and provide the collected data to the model training host 602 for ML model training. In some examples, if the output provided by the actor 608 is inaccurate (or the accuracy is below an accuracy threshold), the model training host 602 may determine to modify or retrain the ML model used by the model inference host, such as via an ML model deployment/update.

In one aspect of the present disclosure, the position estimate of a target device (e.g., the target device 506) may be configured to be a function of reference UE locations (e.g., reference UEs 504), where the position of the target device may be estimated based at least in part on the locations of one or more reference UEs, such as shown by FIG. 5.

Figure 7:
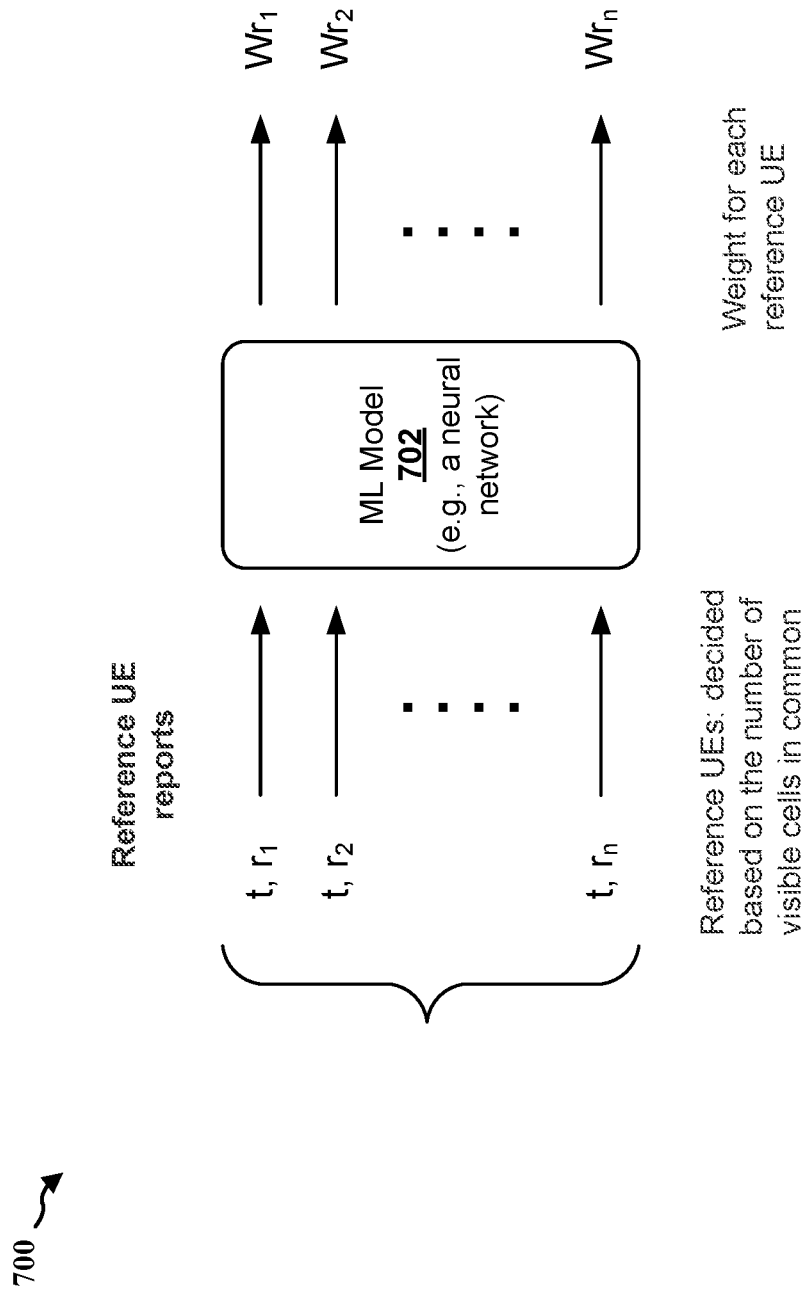
FIG. 7 is a diagram illustrating an example ML model that is capable of receiving inputs from a target UE and multiple reference UEs and providing weights for the input from each of the multiple reference UEs in accordance with various aspects of the present disclosure.

FIG. 7 is a diagram 700 illustrating an example ML model that is capable of receiving inputs from a target UE and multiple reference UEs and providing weights for the input from each of the multiple reference UEs in accordance with various aspects of the present disclosure. For a target UE (t) (e.g., the target device 506), if there is a set of references UEs with known locations (e.g., the reference UEs 504), the set of references UEs may be represented by $R_t$, and each UE in the set of references UEs may be represented by r. In other words, r may be an element/member of the $R_t$ (e.g., $r \in R_t$). For example, if there are ten reference UEs in the set of reference UEs (e.g., $R_t=10$), then the set of reference UEs may include UEs $r_1, r_2, r_3, \ldots, r_{10}$. In one example, the number of reference UEs in the set of reference UEs ($R_t$) may be determined/chosen based on a threshold on the number of common cells between the reference UEs and the target UE. For example, if there are three (3) common cells between the reference UEs and the target UE (e.g., meaning the reference UEs and the target UE are able to scan/measure the same three cells), then the set of reference UEs ($R_t$) may include 5 to 10 reference UEs, whereas if there are one (1) common cells between the reference UEs and the target UE, then the set of reference UEs ($R_t$) may include 10 to 20 reference UEs, etc. In some scenarios, if there are a smaller number of common cells between the reference UEs and the target UE, more reference UEs may be chosen for estimating the position of the target UE to improve the positioning accuracy.

An ML model 702 may be used to infer (e.g., to provide inference for) similarity between each of the multiple UE pairs (t, r), e.g., if there are ten reference UEs ($R_t$=10), then there may be ten (10) UE pairs: (t, $r_1$), (t, $r_2$), (t, $r_3$), (t, $r_{10}$). In other words, the ML model 702 may determine the similarities (e.g., in terms of cell scans/measurements) between a reference UE and the target UE. If there is a high similarity, it may infer that the reference UE and the target UE are in proximity to each other, and therefore the target UE is more likely to be at the reference UE's location. On the other hand, if there is a low similarity, it may infer that the reference UE and the target UE are not close to each other, and therefore the target UE is les s likely to be at the reference UE's location. The ML model 702 may be implemented at a server (e.g., the server 502, a positioning server, a crowd-sourcing server, a location management function (LMF), etc.) or at a network node (e.g., a base station or a component of a base station).

In one example, the ML model 702 may be capable of identifying at least one common cell between the target UE and the set of reference UEs, where an output of the ML model may include at a similarity score between the UE and the set of reference UEs. The at least one common cell may be a single common cell, where the ML model 702 may identify the at least one common cell based on an identifier (ID) of the single common cell. In another example, the at least one common cell may be multiple common cells, where the ML model 702 may identify the at least one common cell based on an ID of the multiple common cells. The at least one common cell may be a serving cell or a non-serving cell across multiple frequency bands for the target UE. In another example, the at least one common cell may share at least one feature, which may include a measurement for the at least one common cell, a UE type, an environmental condition, a cell characteristic associated with the at least one common cell, or a combination thereof.

In one example, the ML model 702 may be associated with a neural network (NN) that is capable of receiving one or more defined features (features$_{t,r}$) from each of the set of reference UEs and the target UE. The features may include the scan information of the target UE and the reference UEs, such as the scan/measurement for each of the common cells by the target UE and reference UEs. For example, the features may include the RSRP for at least one cell or one common, a coverage area for at least one cell or one common, a channel response for at least one cell or one common (e.g., the channel response may include at least one of a timing advance (TA), a reference signal received quality (RSRQ), received signal strength indicator (RSSI), reference signal signal to noise ratio (RSSNR), and/or channel quality indicator (CQI), etc.), device characteristics (e.g., chipset, antenna, device type, etc.) of the target UE or each of the set of reference UEs, the location of each of the set of reference UEs, a position uncertainty for the location of each of the set of reference UEs, or a combination thereof. Then, the ML model 702 may assign a weight ($w_{t,r}$) for each reference UE based on $W_{t,r}$=NN(features$_{t,r}$), r∈$R_t$. For example, if there are ten reference UEs ($R_t$=10), then there may be ten weights $Wr_1$, $Wr_2$, $Wr_3$, . . . , $Wr_{10}$ assigned to the ten reference UEs $r_1$, $r_2$, $r_3$, . . . , $r_{10}$, respectively. For purposes of the present disclosure, a position uncertainty may refer to a standard deviation of an error in latitude and/or longitude. In another example, the position uncertainty may correspond to a semi-major and/or -minor axis of an error ellipse for a certain confidence level (e.g., semi-major and -minor axis of the 95% confidence error ellipse).

For purposes of the present disclosure, the term "weight" may refer to a parameter within a neural network that transforms input data within the network's hidden layers. A neural network may include a series of nodes, or neurons. Within each node is a set of inputs, weight, and a bias value. As an input enters the node, it may get multiplied by a weight value and the resulting output is either observed, or passed to the next layer in the neural network. Often the weights of a neural network are contained within the hidden layers of the network. For example, a single node may take the input data and multiply it by an assigned weight value, then add a bias before passing the data to the next layer. The final layer of the neural network is also known as the output layer. The output layer often tunes the inputs from the hidden layers to produces the desired numbers in a specified range.

Based on weights calculated for the set of reference UEs, the ML outputs for each reference UE may then be fused to estimate the position of the target UE ($x_t$) based on a weighted sum ($\hat{x}_t$)=f($w_{t,r}$, $x_r$)=$\Sigma_{r \in R_t} \tilde{w}_{t,r} x_r$ (i.e., the position estimation of the target UE as a function of reference UE locations ($x_r$)). In some example, the ML model 702 may also be trained to minimize a loss function, such as based on a loss L($\hat{x}_t$, $x_t$), where $\hat{x}_t$ is the ML-based position estimate and $x_t$ is the true position. In one example, the loss L that that is used for training the ML model 702 may be based on a mean squared error: $\|\hat{x}_t - x_t\|^2$. In another example, the loss L may be based on a log-likelihood if the similarities are interpreted as parameters of a distribution. In another example, the ML model 702 may further be trained/tuned/retrained based on measurements from the set of reference UEs and/or the target UE (e.g., for a common cell).

In another aspect of the present disclosure, the position estimate of a target device (e.g., the target device 506) may be configured to be a function of reference UE locations (e.g., reference UEs 504) and cell locations (e.g., neighboring cells 510), where the position of the target device may be estimated based at least in part on the locations of one or more reference UEs and the locations of one or more cells, such as shown by FIG. 5.

Figure 8:
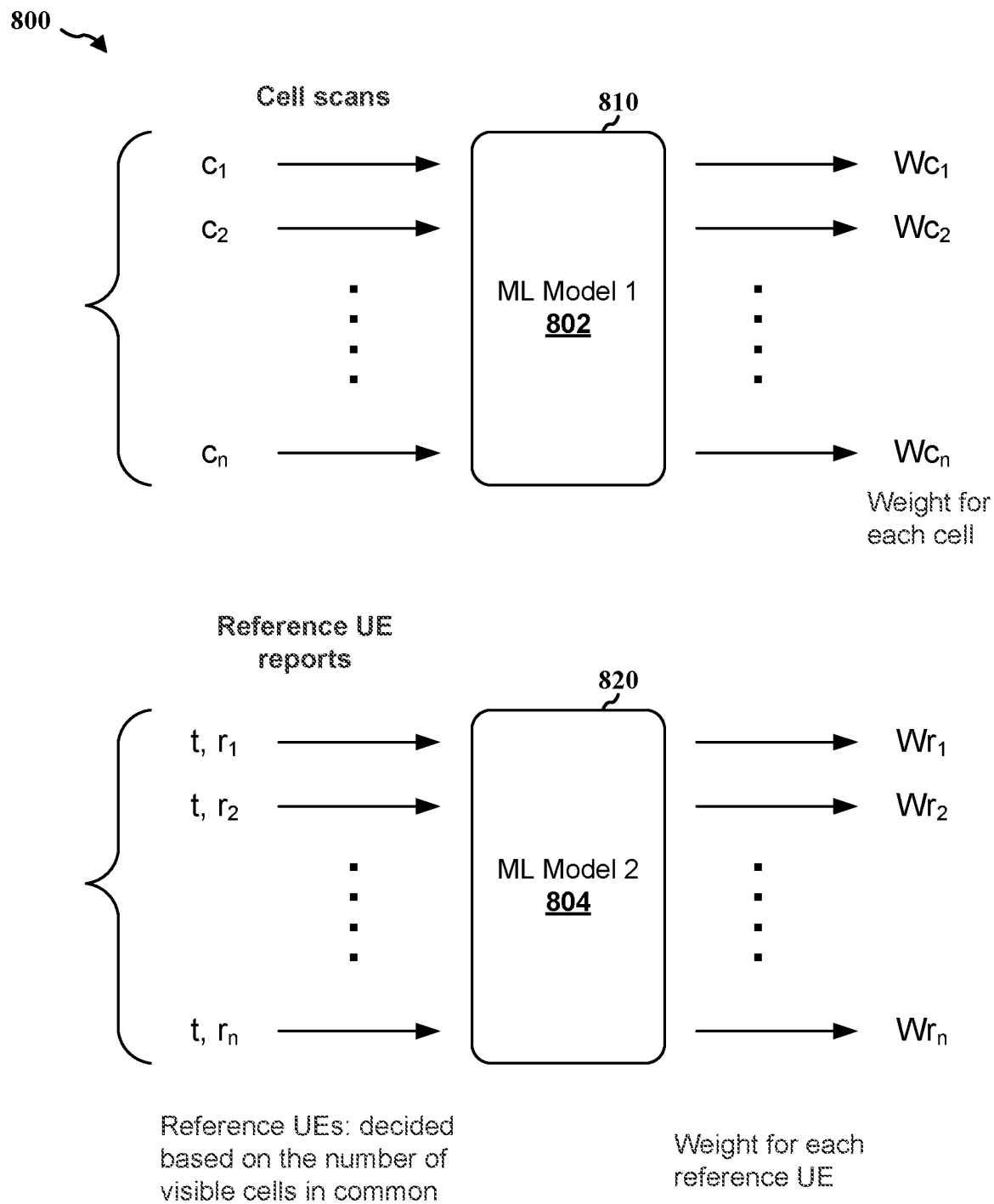
FIG. 8 is a diagram illustrating an example of ML models that are capable of receiving inputs from a target UE and multiple reference UEs and providing weights for the input from each of the multiple reference UEs in accordance with various aspects of the present disclosure.

FIG. 8 is a diagram 800 illustrating an example of ML models that are capable of receiving inputs from a target UE and multiple reference UEs and providing weights for the input from each of the multiple reference UEs in accordance with various aspects of the present disclosure. For a target UE (t) (e.g., the target device 506), an ML framework may make use of the location of a set of cells ($C_t$), where each cell in the set of cells with a known location may be presented by c (e.g., c∈$C_t$). Similarly, the set of references UEs may be represented by $R_t$, and each UE in the set of references UEs with a known location may be represented by r (e.g., r∈$R_t$), such as described in connection with FIG. 7.

As shown at 810, a first ML model 802 may be used to infer cell weights for the set of cells ($C_t$), where each ML model 802 may receive features (features$_{t,r}$) (e.g., cell scans/measurements) associated with the set of reference cells from the target UE as inputs. Then, the ML model 802 may assign a weight ($w_{t,c}$) for each reference cell based on $W_{t,c}$=NN(features$_{t,c}$), c∈$C_t$. For example, if there are ten reference cells ($C_t$=10), then there may be ten weights $Wc_1$, $Wc_2$, $Wc_3$, . . . , $Wc_{10}$ assigned to cells $c_1$, $c_2$, $c_3$, . . . , $c_{10}$, respectively. The features may include the scan information of the target UE, such as the scan/measurement for each of the reference cells by the target UE.

Similarly, as shown at 820, a second ML model 804 may be used to infer similarity between each of the multiple UE pairs (t, r), such as described in connection with FIG. 7. For example, the second ML model 804 may receive one or more defined features (features$_{t,r}$) from each of the set of reference UEs and the target UE, such as scan information for one or more cells from the target UE and the reference UEs. The features may include the RSRP for at least one cell or one common cell, a coverage area for at least one cell or one common cell, a channel response for at least one cell or one common cell (e.g., the channel response may include at least one of a TA, an RSRQ, an RSSI, an RSSNR, and/or a CQI), device characteristics (e.g., chipset, antenna, device type, etc.) of the target UE or each of the set of reference UEs, the location of each of the set of reference UEs, a position uncertainty (which may also be referred to as a geotag uncertainty in some examples) for the location of each of the set of reference UEs, or a combination thereof. Then, the second ML model 804 may assign a weight ($w_{t,r}$) for each reference UE based on $W_{t,r}$=NN(features$_{t,r}$), r∈R$_t$. For example, if there are ten reference UEs (R$_t$=10), then there may be ten weights Wr$_1$, Wr$_2$, Wr$_3$, . . . , Wr$_{10}$ assigned to reference UEs r$_1$, r$_2$, r$_3$, . . . , r$_{10}$, respectively. The first ML model 802 and/or the second ML model 804 may be implemented at a server (e.g., the server 502, a positioning server, a crowd-sourcing server, an LMF, etc.) or at a network node (e.g., a base station or a component of a base station).

In one example, the first ML model 802 and/or the second ML model 804 may be capable of identifying at least one common cell between the target UE and the set of reference UEs, where an output of the ML model may include at a similarity score between the UE and the set of reference UEs. The at least one common cell may be a single common cell, where the first ML model 802 and/or the second ML model 804 may identify the at least one common cell based on an ID of the single common cell. In another example, the at least one common cell may be multiple common cells, where the first ML model 802 and/or the second ML model 804 may identify the at least one common cell based on an ID of the multiple common cells. The at least one common cell may be a serving cell or a non-serving cell across multiple frequency bands for the target UE. In another example, the at least one common cell may share at least one feature, which may include a measurement for the at least one common cell, a UE type, an environmental condition, a cell characteristic associated with the at least one common cell, or a combination thereof.

After obtaining the weights for the set of reference UEs and the cells, the location of the target UE ($x_t$) may be estimated by fusing the outputs from the first ML model 802 and the second ML model 804 based on a weighted sum ($\hat{x}_t$)=f($w_{t,c}$ $x_c$, $w_{t,r}$, $x_r$)=Σ$_{c \in C_t}$ $\tilde{w}_{t,c}$ $x_c$+Σ$_{r \in R_t}$ $\tilde{w}_{t,r}$ $x_r$ (i.e., the position estimation of the target UE as a function of reference UE locations ($x_r$) and cell locations ($x_c$)). In some example, the first ML model 802 and/or the second ML model 804 may also be trained to minimize the loss L($\hat{x}_t$, $x_t$). In another example, the first ML model 802 and/or the second ML model 804 may further be trained/tuned/retrained based on measurements from the set of reference UEs and/or the target UE (e.g., for a common cell).

In another aspect of the present disclosure, an ML model (e.g., the ML model 702, 802, 804) may be configured to operate on a per-cell basis. For example, an ML model may infer a per-cell similarity between a target UE and each of the reference UEs, where the ML model may compare similarities (e.g., based on one or more features) between the target UE and each reference UE with respect to one cell and provide a weight for each reference UE. Then, the ML model may sum up the similarities associated with the set of reference UEs based on the weight to obtain a similarity score: $w_{t,r}$=Σ$_{c \in C_{t,r}}$NN(features$_{t,r,c}$). In some examples, the one or more features may include the scan information of the target UE and the set of reference UEs from a particular cell (c), and the location of the reference UE relative to that cell (c). In addition, or as an alternative, the ML model may also be configured to infer a per-cell dissimilarity, based on cells not in common between the set of reference UEs and the target UE.

In another example, an ML model (e.g., the ML model 702, 802, 804) may operate on an across-cells basis. For example, the ML model may use summary statistics across cells as inputs, such as mean and standard deviation of per-cell features (e.g., the RSRP measurements). In one example, the summary statistics may just include cells seen/detectable by the reference UEs and target UE. In another example, the summary statistics may include statistics across non-common cells. A non-common cell between a reference UE and a target UE may refer to a cell that can be seen/detected/scanned by either the reference UE or the target UE, but not by both.

As described in connection with FIGS. 7 and 8, the output from an ML model (e.g., the ML model 702, 802, 804) may be based on a weighted sum ($\hat{x}_t$), such as $\hat{x}_t$=Σ$_{r \in R_t}$ $\tilde{w}_{t,r}$ $x_r$ (for position estimation of the target UE as a function of reference UE locations) or $\hat{x}_t$=Σ$_{c \in C_t}$ $\tilde{w}_{t,c}$ $x_c$+Σ$_{r \in R_t}$ $\tilde{w}_{t,r}$ $x_r$ (where $\tilde{w}_t$=softmax($w_t$) (for position estimation of the target UE as a function of reference UE locations and cell locations). As such, the weighted sum may include reference UEs, cells, or both, based on criteria such as the number of reference UEs, the number of cells reported by each reference UE and/or by the target UE, the number of cells in common, or a combination thereof.

In another example, the ML model may be configured to just include a subset of reference UEs and cells in the weighted sum. For example, if there are ten (10) reference UEs in the set of reference UEs, the ML model may select just five (5) reference UEs from the set of reference UEs for calculating the weighted sum. In one example, a similarity threshold may be configured for the similarity reported by the ML model, where the similarity threshold may be used by the ML model for determining which UEs/cells are to be included for calculating the weighted sum (e.g., reference UEs(s) and/or cell(s) with similarities above the similarity threshold are included for calculating the weighted sum and reference UEs(s) and/or cell(s) with similarities below the similarity threshold are excluded from calculating the weighted sum, etc.). In another example, if a coarse location estimate of a target UE is available (which may be determined based on another positioning mechanism as described in connection with FIG. 4), the ML model may use the course location estimate of the target UE to select the reference UEs(s) and/or cell(s) for calculating the weighted sum. For example, the ML model may select reference UEs(s) and/or cell(s) that are nearby the target UE (e.g., within a defined distance of the course location estimate of the target UE).

In another example, the fusion of the ML outputs may be based on a likelihood fusion, where the weights determined for the one or more reference UEs and/or cells may be interpreted as parameters of a probability distribution. For example, a standard deviation corresponding to a Gaussian probability density function (PDF) around the location of each reference UE. Then, the position likelihood of the target device may be obtained by fusing the likelihoods obtained from each of the reference UEs. In another example, the fusion of the ML outputs may be based on an ML-based fusion, where an ML model may be trained to fuse information from the one or more reference UEs and/or cells. In one example, the loss L that may be used for training the ML model may be based on the mean squared error: $\|\hat{x}_t - x_t\|^2$. Alternatively, the loss L that may be used for training the ML model may be based on a log-likelihood if the similarities are interpreted as parameters of a distribution.

In another aspect of the present disclosure, a target UE (e.g., the target UE 506) may signal a set of criteria/indications to a server (e.g., the server 502) for the server to determine the type of ML model and/or the type of fusion to be used. For example, a target UE may signal to a server its capabilities for cell scans/measurements, and in response, the server may configure at least one ML model (e.g., the ML model 702, 802, 804) that is suitable for inferencing the position of the target UE based on the capabilities of the target UE. In another example, a target UE may specifically indicate to a server the ML model it supports, and the server may configure the corresponding ML model for inferencing the position of the target UE. In some examples, the fusion of ML outputs for reference UEs and/or cells may occur across operators and across multiple frequency bands. In another example, a server (e.g., the server 502) may transmit a configuration for the target UE to configure the target UE to measure at least one cell. In response, the target UE may measure/scan the at least one cell based on the configuration, and the target UE may transmit the measurements/scans for the at least one cell back to the server.

By making use of reference UE locations and/or cell locations, the similarity learning framework described herein may achieve both generalizable and localized positioning for a target device. For example, by averaging cell locations, a physics-based (generalizable) mapping from RSRP to a range between a target UE and a reference cell may be obtained. Similarly, by averaging reference UE locations, a localized mapping corresponding to environmental conditions (e.g., terrain, blockers, etc.) surrounding a target UE may also be obtained. Thus, aspects presented herein may enable a more accurate positioning for a target UE, such as an IoT device that has a low-power specification.

Figure 9:
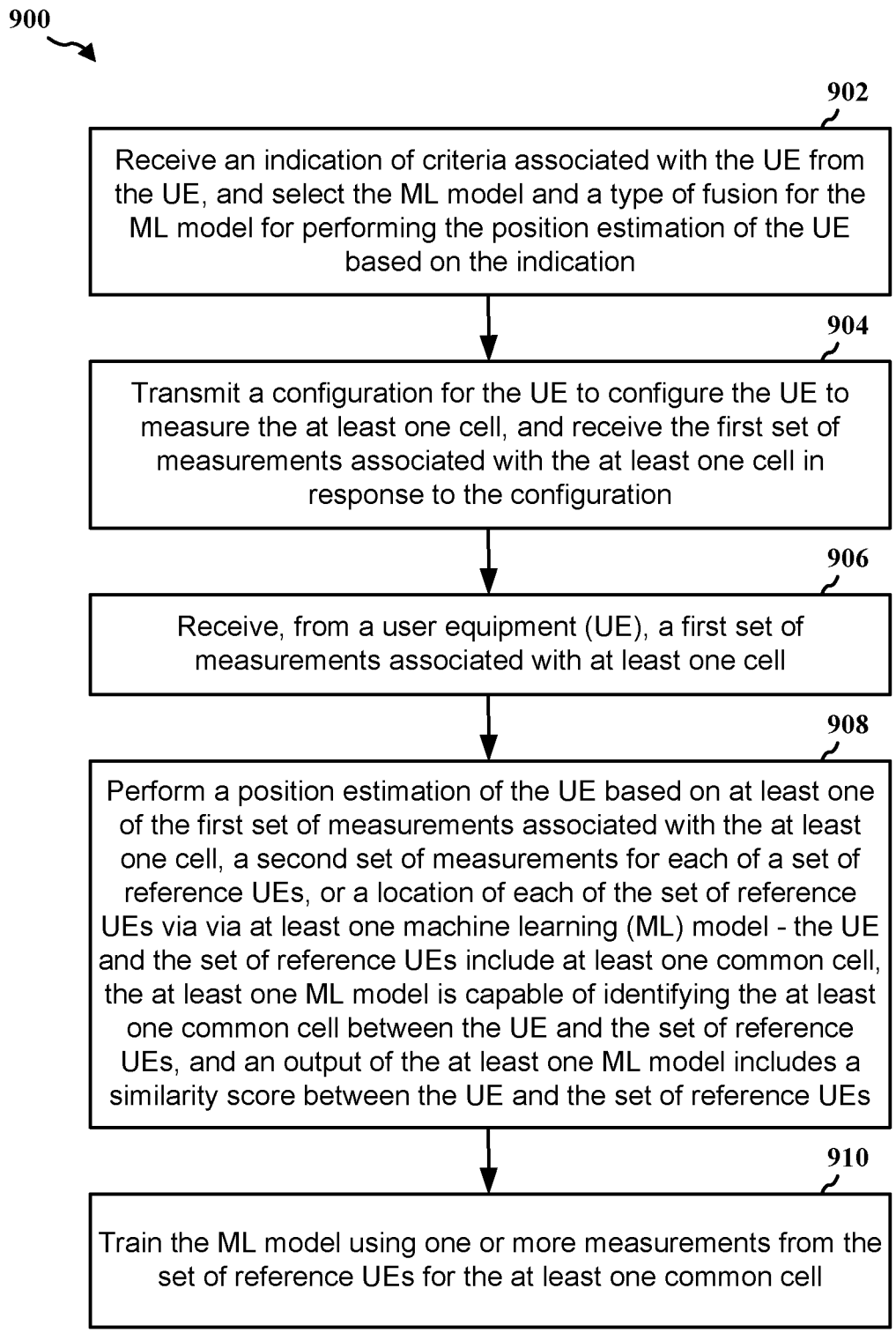
FIG. 9 is a flowchart of a method of wireless communication.

FIG. 9 is a flowchart 900 of a method of wireless communication. The method may be performed by a network entity (e.g., the base station 102; the server 502; the ML model 702, 802, 804; the network entity 1102). The method may enable the network entity to determine the position of a UE based on crowd-sourcing and via at least one type of AI/ML framework.

At 906, the network entity may receive a first set of measurements associated with at least one cell from a UE, such as described in connection with FIGS. 5, 7 and 8. For example, as shown at 506 of FIG. 5, the server 502 may receive a set of scans/measurements associated with one or more neighboring cells 510 from a target device 506. The reception of the first set of measurements may be performed by, e.g., the crowd-sourcing positioning component 199 and/or the transceiver(s) 1146 of the network entity 1102 in FIG. 11.

At 908, the network entity may perform a position estimation of the UE based on at least one of the first set of measurements associated with the at least one cell, a second set of measurements for each of a set of reference UEs, or a location of each of the set of reference UEs via at least one ML model, where the UE and the set of reference UEs include at least one common cell, where the at least one ML model is capable of identifying the at least one common cell between the UE and the set of reference UEs, and where an output of the at least one ML model includes a similarity score between the UE and the set of reference UEs, such as described in connection with FIGS. 5, 7 and 8. For example, as described in connection with FIG. 5, the server 502 may perform a position estimation for the target device 506 based on measurements associated with the one or more neighboring cells 510, measurements for each of a set of reference UEs, or a location of each of the set of reference UEs via an ML model (e.g., the ML model 702, 802, 804, etc.), where the target device and the set of reference UEs may include at least one common cell. The position estimation of the UE may be performed by, e.g., the crowd-sourcing positioning component 199 and/or the transceiver(s) 1146 of the network entity 1102 in FIG. 11.

In one example, at 902, the network entity may receive an indication of criteria associated with the UE from the UE, and the network entity may select the ML model and a type of fusion for the ML model for performing the position estimation of the UE based on the indication, such as described in connection with FIGS. 5, 7 and 8. The reception of the indication of criteria associated with the UE and/or the selection of the ML model and the type of fusion for the ML model may be performed by, e.g., the crowd-sourcing positioning component 199 and/or the transceiver(s) 1146 of the network entity 1102 in FIG. 11.

In another example, at 904, the network entity may transmit a configuration for the UE to configure the UE to measure the at least one cell, and the network entity may receive the first set of measurements associated with the at least one cell in response to the configuration, such as described in connection with FIGS. 5, 7 and 8. The transmission of the configuration and/or the reception of the first set of measurements associated with the at least one cell may be performed by, e.g., the crowd-sourcing positioning component 199 and/or the transceiver(s) 1146 of the network entity 1102 in FIG. 11.

In another example, at 910, the network entity may train the ML model using one or more measurements from the set of reference UEs for the at least one common cell, such as described in connection with FIGS. 5, 7 and 8. The training of the ML model may be performed by, e.g., the crowd-sourcing positioning component 199 and/or the transceiver(s) 1146 of the network entity 1102 in FIG. 11.

In another example, the position estimation of the UE is further based on a location of the at least one cell.

In another example, the first set of measurements or the second set of measurements include at least one of: an RSRP for the at least one cell, a coverage area for the at least one cell, a channel response for the at least one cell, device characteristics of the UE or each of the set of reference UEs, the location of each of the set of reference UEs, or a position uncertainty for the location of each of the set of reference UEs. In such an example, the channel response includes at least one of a TA, an RSRQ, an RSSI, an RSSNR, and/or a CQI. In another example, the at least one ML model includes a first ML model and a second ML model, the first ML model being configured to infer a first set of weights for the first set of measurements associated with the at least one cell and the second ML model being configured to infer a second set of weights for the second set of measurements for each of the set of reference UEs, such as described in connection with FIG. 8. In such an example, the position estimation of the UE is based on fusing outputs of the first ML model based on the first set of weights and the second ML model based on the second set of weights.

In another example, a set of outputs from the ML model is fused based on a weighted sum associated with the set of reference UEs, the at least one cell, the at least one common cell, or a combination thereof. In such an example, the weighted sum is based on a number of the set of reference UEs, a number of cells reported by each of the set of reference UEs, a number of cells reported by the UE, a number of the at least one common cell.

In another example, the ML model is capable of identifying the at least one common cell between the UE and the set of reference UEs, and where an output of the ML model includes at a similarity score between the UE and the set of reference UEs. In such an example, the at least one common cell is a single common cell, and where the ML model identifies the at least one common cell based on an ID of the single common cell, or the at least one common cell is multiple common cells, and where the ML model identifies the at least one common cell based on an ID of the multiple common cells.

In another example, the at least one cell for the UE is a serving cell or a non-serving cell across multiple frequency bands.

In another example, the at least one common cell is associated with at least one feature including one or more of: a measurement for the at least one common cell, a UE type, an environmental condition, a cell characteristic associated with the at least one common cell, or a combination thereof.

Figure 10:
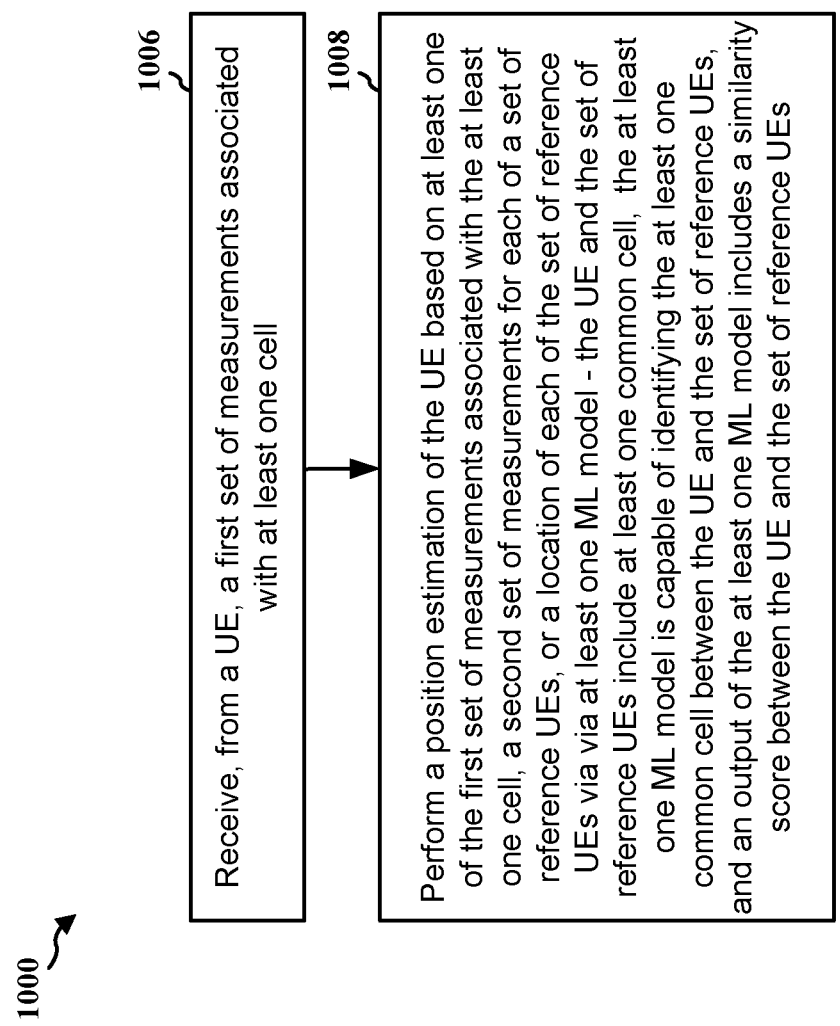
FIG. 10 is a flowchart of a method of wireless communication.

FIG. 10 is a flowchart 1000 of a method of wireless communication. The method may be performed by a network entity (e.g., the base station 102; the server 502; the ML model 702, 802, 804; the network entity 1102). The method may enable the network entity to determine the position of a UE based on crowd-sourcing and via at least one type of AI/ML framework.

At 1006, the network entity may receive a first set of measurements associated with at least one cell from a UE, such as described in connection with FIGS. 5, 7 and 8. For example, as shown at 506 of FIG. 5, the server 502 may receive a set of scans/measurements associated with one or more neighboring cells 510 from a target device 506. The reception of the first set of measurements may be performed by, e.g., the crowd-sourcing positioning component 199 and/or the transceiver(s) 1146 of the network entity 1102 in FIG. 11.

At 1008, the network entity may perform a position estimation of the UE based on at least one of the first set of measurements associated with the at least one cell, a second set of measurements for each of a set of reference UEs, or a location of each of the set of reference UEs via at least one ML model, where the UE and the set of reference UEs include at least one common cell, where the at least one ML model is capable of identifying the at least one common cell between the UE and the set of reference UEs, and where an output of the at least one ML model includes a similarity score between the UE and the set of reference UEs, such as described in connection with FIGS. 5, 7 and 8. For example, as described in connection with FIG. 5, the server 502 may perform a position estimation for the target device 506 based on measurements associated with the one or more neighboring cells 510, measurements for each of a set of reference UEs, or a location of each of the set of reference UEs via an ML model (e.g., the ML model 702, 802, 804, etc.), where the target device and the set of reference UEs may include at least one common cell. The position estimation of the UE may be performed by, e.g., the crowd-sourcing positioning component 199 and/or the transceiver(s) 1146 of the network entity 1102 in FIG. 11.

In one example, the network entity may receive an indication of criteria associated with the UE from the UE, and the network entity may select the ML model and a type of fusion for the ML model for performing the position estimation of the UE based on the indication, such as described in connection with FIGS. 5, 7 and 8. The reception of the indication of criteria associated with the UE and/or the selection of the ML model and the type of fusion for the ML model may be performed by, e.g., the crowd-sourcing positioning component 199 and/or the transceiver(s) 1146 of the network entity 1102 in FIG. 11.

In another example, the network entity may transmit a configuration for the UE to configure the UE to measure the at least one cell, and the network entity may receive the first set of measurements associated with the at least one cell in response to the configuration, such as described in connection with FIGS. 5, 7 and 8. The transmission of the configuration and/or the reception of the first set of measurements associated with the at least one cell may be performed by, e.g., the crowd-sourcing positioning component 199 and/or the transceiver(s) 1146 of the network entity 1102 in FIG. 11.

In another example, the network entity may train the ML model using one or more measurements from the set of reference UEs for the at least one common cell, such as described in connection with FIGS. 5, 7 and 8. The training of the ML model may be performed by, e.g., the crowd-sourcing positioning component 199 and/or the transceiver(s) 1146 of the network entity 1102 in FIG. 11.

In another example, the position estimation of the UE is further based on a location of the at least one cell.

In another example, the first set of measurements or the second set of measurements include at least one of: an RSRP for the at least one cell, a coverage area for the at least one cell, a channel response for the at least one cell, device characteristics of the UE or each of the set of reference UEs, the location of each of the set of reference UEs, or a position uncertainty for the location of each of the set of reference UEs. In such an example, the channel response includes at least one of a TA, an RSRQ, an RSSI, an RSSNR, and/or a CQI.

In another example, the at least one ML model includes a first ML model and a second ML model, the first ML model being configured to infer a first set of weights for the first set of measurements associated with the at least one cell and the second ML model being configured to infer a second set of weights for the second set of measurements for each of the set of reference UEs, such as described in connection with FIG. 8. In such an example, the position estimation of the UE is based on fusing outputs of the first ML model based on the first set of weights and the second ML model based on the second set of weights.

In another example, a set of outputs from the ML model is fused based on a weighted sum associated with the set of reference UEs, the at least one cell, the at least one common cell, or a combination thereof. In such an example, the weighted sum is based on a number of the set of reference UEs, a number of cells reported by each of the set of reference UEs, a number of cells reported by the UE, a number of the at least one common cell.

In another example, the ML model is capable of identifying the at least one common cell between the UE and the set of reference UEs, and where an output of the ML model includes at a similarity score between the UE and the set of reference UEs. In such an example, the at least one common cell is a single common cell, and where the ML model identifies the at least one common cell based on an ID of the single common cell, or the at least one common cell is multiple common cells, and where the ML model identifies the at least one common cell based on an ID of the multiple common cells.

In another example, the at least one cell for the UE is a serving cell or a non-serving cell across multiple frequency bands.

In another example, the at least one common cell is associated with at least one feature including one or more of: a measurement for the at least one common cell, a UE type, an environmental condition, a cell characteristic associated with the at least one common cell, or a combination thereof.

Figure 11:
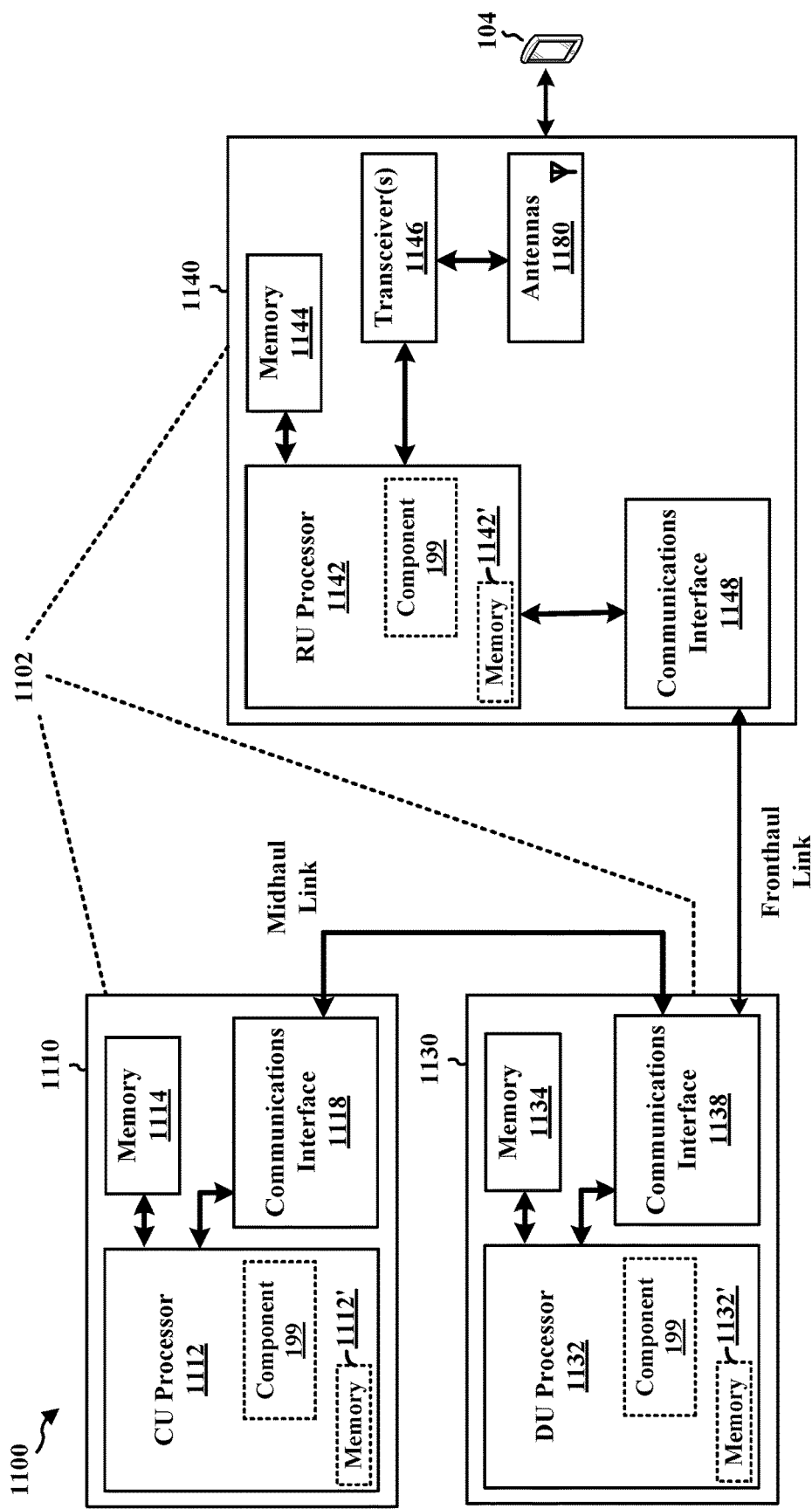
FIG. 11 is a diagram illustrating an example of a hardware implementation for an example apparatus and/or network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the crowd-sourcing positioning component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the crowd-sourcing positioning component 199 is configured to receive a first set of measurements associated with at least one cell from a UE. The crowd-sourcing positioning component 199 may further be configured to perform a position estimation of the UE based on at least one of the first set of measurements associated with the at least one cell, a second set of measurements for each of a set of reference UEs, or a location of each of the set of reference UEs via at least one ML model, where the UE and the set of reference UEs include at least one common cell, where the at least one ML model is capable of identifying the at least one common cell between the UE and the set of reference UEs, and where an output of the at least one ML model includes a similarity score between the UE and the set of reference UEs. The crowd-sourcing positioning component 199 may be within one or more processors of one or more of the CU 1110, DU 1130, and the RU 1140. The crowd-sourcing positioning component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for receiving a first set of measurements associated with at least one cell from a UE. The network entity 1102 may further include means for performing a position estimation of the UE based on at least one of the first set of measurements associated with the at least one cell, a second set of measurements for each of a set of reference UEs, or a location of each of the set of reference UEs via at least one ML model, where the UE and the set of reference UEs include at least one common cell, where the at least one ML model is capable of identifying the at least one common cell between the UE and the set of reference UEs, and where an output of the at least one ML model includes a similarity score between the UE and the set of reference UEs.

In one configuration, the network entity 1102 may further include means for receiving an indication of criteria associated with the UE from the UE, and means for selecting the ML model and a type of fusion for the ML model for performing the position estimation of the UE based on the indication.

In another configuration, the network entity 1102 may further include means for transmitting a configuration for the UE to configure the UE to measure the at least one cell, and the means for receiving the first set of measurements associated with the at least one cell in response to the configuration.

In another configuration, the network entity 1102 may further include means for training the ML model using one or more measurements from the set of reference UEs for the at least one common cell.

In another configuration, the position estimation of the UE is further based on a location of the at least one cell.

In another configuration, the first set of measurements or the second set of measurements include at least one of: an RSRP for the at least one cell, a coverage area for the at least one cell, a channel response for the at least one cell, device characteristics of the UE or each of the set of reference UEs, the location of each of the set of reference UEs, or a position uncertainty for the location of each of the set of reference UEs. In such a configuration, the channel response includes at least one of a TA, an RSRQ, an RSSI, an RSSNR, and/or a CQI. In another configuration, the at least one ML model includes a first ML model and a second ML model, the first ML model being configured to infer a first set of weights for the first set of measurements associated with the at least one cell and the second ML model being configured to infer a second set of weights for the second set of measurements for each of the set of reference UEs. In such a configuration, the position estimation of the UE is based on fusing outputs of the first ML model based on the first set of weights and the second ML model based on the second set of weights.

In another configuration, a set of outputs from the ML model is fused based on a weighted sum associated with the set of reference UEs, the at least one cell, the at least one common cell, or a combination thereof. In such a configuration, the weighted sum is based on a number of the set of reference UEs, a number of cells reported by each of the set of reference UEs, a number of cells reported by the UE, a number of the at least one common cell.

In another configuration, the ML model is capable of identifying the at least one common cell between the UE and the set of reference UEs, and where an output of the ML model includes at a similarity score between the UE and the set of reference UEs. In such a configuration, the at least one common cell is a single common cell, and where the ML model identifies the at least one common cell based on an ID of the single common cell, or the at least one common cell is multiple common cells, and where the ML model identifies the at least one common cell based on an ID of the multiple common cells.

In another configuration, the at least one cell for the UE is a serving cell or a non-serving cell across multiple frequency bands.

In another configuration, the at least one common cell is associated with at least one feature including one or more of: a measurement for the at least one common cell, a UE type, an environmental condition, a cell characteristic associated with the at least one common cell, or a combination thereof.

The means may be the crowd-sourcing positioning component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: receiving a first set of measurements associated with at least one cell from a UE; and performing a position estimation of the UE based on at least one of the first set of measurements associated with the at least one cell, a second set of measurements for each of a set of reference UEs, or a location of each of the set of reference UEs via at least one machine learning (ML) model, wherein the UE and the set of reference UEs include at least one common cell, wherein the at least one ML model is capable of identifying the at least one common cell between the UE and the set of reference UEs, and wherein an output of the at least one ML model includes a similarity score between the UE and the set of reference UEs.

Aspect 2 is the method of aspect 1, where the position estimation of the UE is further based on a location of the at least one cell.

Aspect 3 is the method of aspect 1 or aspect 2, where the first set of measurements or the second set of measurements include at least one of: an RSRP for the at least one cell, a coverage area for the at least one cell, a channel response for the at least one cell, device characteristics of the UE or each of the set of reference UEs, the location of each of the set of reference UEs, or a position uncertainty for the location of each of the set of reference UEs.

Aspect 4 is the method of aspect 3, where the channel response includes at least one of a TA, an RSRQ, an RSSI, an RSSNR, and/or a CQI.

Aspect 5 is the method of any of aspects 1 to 4, wherein a set of outputs from the at least one ML model is fused based on a weighted sum associated with the set of reference UEs, the at least one cell, the at least one common cell, or a combination thereof.

Aspect 6 is the method of aspect 5, where the weighted sum is based on a number of the set of reference UEs, a number of cells reported by each of the set of reference UEs, a number of cells reported by the UE, a number of the at least one common cell.

Aspect 7 is the method of any of aspects 1 to 6, further including: receiving an indication of criteria associated with the UE from the UE; and selecting the at least one ML model and a type of fusion for the at least one ML model for performing the position estimation of the UE based on the indication.

Aspect 8 is the method of any of aspects 1 to 7, where the at least one ML model includes a first ML model and a second ML model, the first ML model being configured to infer a first set of weights for the first set of measurements associated with the at least one cell and the second ML model being configured to infer a second set of weights for the second set of measurements for each of the set of reference UEs.

Aspect 9 is the method of aspect 8, where the position estimation of the UE is based on fusing outputs of the first ML model based on the first set of weights and the second ML model based on the second set of weights.

Aspect 10 is the method of any of aspects 1 to 9, where the at least one common cell is a single common cell, and where the ML model identifies the at least one common cell based on an ID of the single common cell.

Aspect 11 is the method of any of aspects 1 to 10, where the at least one common cell is multiple common cells, and where the ML model identifies the at least one common cell based on an ID of the multiple common cells.

Aspect 12 is the method of any of aspects 1 to 11, further including: training the at least one ML model using one or more measurements from the set of reference UEs for the at least one common cell.

Aspect 13 is the method of any of aspects 1 to 12, where the at least one cell for the UE is a serving cell or a non-serving cell across multiple frequency bands.

Aspect 14 is the method of any of aspects 1 to 13, further including: transmitting a configuration for the UE to configure the UE to measure the at least one cell; and receiving the first set of measurements associated with the at least one cell in response to the configuration.

Aspect 15 is the method of any of aspects 1 to 14, where the at least one common cell is associated with at least one feature including one or more of: a measurement for the at least one common cell, a UE type, an environmental condition, a cell characteristic associated with the at least one common cell, or a combination thereof.

Aspect 16 is an apparatus for wireless communication at a first UE, including: a memory; and at least one processor coupled to the memory and, based at least in part on information stored in the memory, the at least one processor is configured to implement any of aspects 1 to 15.

Aspect 17 is the apparatus of aspect 16, further including at least one of a transceiver or an antenna coupled to the at least one processor, where the at least one processor is configured to receive the first set of measurements via at least one of the transceiver or the antenna.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

What is claimed is:

1. An apparatus for wireless communication at a network entity, comprising:
   memory; and
   at least one processor coupled to the memory and, based at least in part on information stored in the memory, the at least one processor is configured to:
      receive, from a user equipment (UE), a first set of measurements associated with at least one cell; and
      perform a position estimation of the UE based on at least one of the first set of measurements associated with the at least one cell, a second set of measurements for each of a set of reference UEs, or a location of each of the set of reference UEs via at least one machine learning (ML) model, wherein the UE and the set of reference UEs include at least one common cell, wherein the at least one ML model is capable of identifying the at least one common cell between the UE and the set of reference UEs, and wherein an output of the at least one ML model includes a similarity score between the UE and the set of reference UEs, wherein the similarity score is on a per-cell basis.

2. The apparatus of claim 1, wherein the position estimation of the UE is further based on a location of the at least one cell.

3. The apparatus of claim 1, wherein the first set of measurements or the second set of measurements include at least one of:
   a reference signal received power (RSRP) for the at least one cell,
   a coverage area for the at least one cell,
   a channel response for the at least one cell,
   device characteristics of the UE or each of the set of reference UEs,
   the location of each of the set of reference UEs, or
   a position uncertainty for the location of each of the set of reference UEs.

4. The apparatus of claim 3, wherein the channel response includes at least one of a timing advance (TA), a reference signal received quality (RSRQ), a received signal strength indicator (RSSI), a reference signal signal to noise ratio (RSSNR), or a channel quality indicator (CQI).

5. The apparatus of claim 1, wherein a set of outputs from the at least one ML model is fused based on a weighted sum associated with the set of reference UEs, the at least one cell, the at least one common cell, or a combination thereof.

6. The apparatus of claim 5, wherein the weighted sum is based on a number of the set of reference UEs, a number of cells reported by each of the set of reference UEs, a number of cells reported by the UE, a number of the at least one common cell.

7. The apparatus of claim 1, wherein the at least one processor is further configured to:
   receive an indication of criteria associated with the UE from the UE; and
   select the at least one ML model and a type of fusion for the at least one ML model for performing the position estimation of the UE based on the indication.

8. The apparatus of claim 1, wherein the at least one ML model includes a first ML model and a second ML model, the first ML model being configured to infer a first set of weights for the first set of measurements associated with the at least one cell and the second ML model being configured to infer a second set of weights for the second set of measurements for each of the set of reference UEs.

9. The apparatus of claim 8, wherein the position estimation of the UE is based on fusing outputs of the first ML model based on the first set of weights and the second ML model based on the second set of weights.

10. The apparatus of claim 1, wherein the at least one common cell is a single common cell, and wherein the ML model identifies the at least one common cell based on an identifier (ID) of the single common cell.

11. The apparatus of claim 1, wherein the at least one common cell is multiple common cells, and wherein the ML model identifies the at least one common cell based on an identifier (ID) of the multiple common cells.

12. The apparatus of claim 1, wherein the at least one processor is further configured to:
train the at least one ML model using one or more measurements from the set of reference UEs for the at least one common cell.

13. The apparatus of claim 1, wherein the at least one cell for the UE is a serving cell or a non-serving cell across multiple frequency bands.

14. The apparatus of claim 1, wherein the at least one processor is further configured to:
transmit a configuration for the UE to configure the UE to measure the at least one cell; and
receive the first set of measurements associated with the at least one cell in response to the configuration.

15. The apparatus of claim 1, wherein the at least one common cell is associated with at least one feature including one or more of:
a measurement for the at least one common cell,
a UE type,
an environmental condition,
a cell characteristic associated with the at least one common cell, or
a combination thereof.

16. The apparatus of claim 1, further comprising at least one of a transceiver or an antenna coupled to the at least one processor, wherein to receive the first set of measurements, the at least one processor is configured to receive the first set of measurements via at least one of the transceiver or the antenna.

17. A method of wireless communication at a network entity, comprising:
receiving, from a user equipment (UE), a first set of measurements associated with at least one cell; and
performing a position estimation of the UE based on at least one of the first set of measurements associated with the at least one cell, a second set of measurements for each of a set of reference UEs, or a location of each of the set of reference UEs via at least one machine learning (ML) model, wherein the UE and the set of reference UEs include at least one common cell, wherein the at least one ML model is capable of identifying the at least one common cell between the UE and the set of reference UEs, and wherein an output of the at least one ML model includes a similarity score between the UE and the set of reference UEs, wherein the similarity score is on a per-cell basis.

18. The method of claim 17, wherein the position estimation of the UE is further based on a location of the at least one cell.

19. The method of claim 17, wherein the first set of measurements or the second set of measurements include at least one of:

a reference signal received power (RSRP) for the at least one cell,
a coverage area for the at least one cell,
a channel response for the at least one cell,
device characteristics of the UE or each of the set of reference UEs,
the location of each of the set of reference UEs, or
a position uncertainty for the location of each of the set of reference UEs.

20. The method of claim 19, wherein the channel response includes at least one of a timing advance (TA), a reference signal received quality (RSRQ), a received signal strength indicator (RSSI), a reference signal signal to noise ratio (RSSNR), or a channel quality indicator (CQI).

21. The method of claim 17, wherein a set of outputs from the at least one ML model is fused based on a weighted sum associated with the set of reference UEs, the at least one cell, the at least one common cell, or a combination thereof.

22. The method of claim 21, wherein the weighted sum is based on a number of the set of reference UEs, a number of cells reported by each of the set of reference UEs, a number of cells reported by the UE, a number of the at least one common cell.

23. The method of claim 17, further comprising:
receiving an indication of criteria associated with the UE from the UE; and
selecting the at least one ML model and a type of fusion for the at least one ML model for performing the position estimation of the UE based on the indication.

24. The method of claim 17, wherein the at least one ML model includes a first ML model and a second ML model, the first ML model being configured to infer a first set of weights for the first set of measurements associated with the at least one cell and the second ML model being configured to infer a second set of weights for the second set of measurements for each of the set of reference UEs.

25. The method of claim 24, wherein the position estimation of the UE is based on fusing outputs of the first ML model based on the first set of weights and the second ML model based on the second set of weights.

26. The method of claim 25, wherein the at least one common cell is a single common cell or multiple common cells, and wherein the at least one ML model identifies the at least one common cell based on an identifier (ID) of the single common cell or the multiple common cells.

27. The method of claim 17, further comprising:
training the at least one ML model using one or more measurements from the set of reference UEs for the at least one common cell.

28. The method of claim 17, further comprising:
transmitting a configuration for the UE to configure the UE to measure the at least one cell; and
receiving the first set of measurements associated with the at least one cell in response to the configuration.

29. An apparatus for wireless communication at a network entity, comprising:
means for receiving, from a user equipment (UE), a first set of measurements associated with at least one cell; and
means for performing a position estimation of the UE based on at least one of the first set of measurements associated with the at least one cell, a second set of measurements for each of a set of reference UEs, or a location of each of the set of reference UEs via at least one machine learning (ML) model, wherein the UE and the set of reference UEs include at least one common cell, wherein the at least one ML model is capable of identifying the at least one common cell between the UE and the set of reference UEs, and wherein an output of the at least one ML model includes a similarity score between the UE and the set of reference UEs, wherein the similarity score is on a per-cell basis.

30. A non-transitory computer-readable medium storing computer executable code at a network entity, the code when executed by a processor causes the processor to:
receive, from a user equipment (UE), a first set of measurements associated with at least one cell; and
perform a position estimation of the UE based on at least one of the first set of measurements associated with the at least one cell, a second set of measurements for each of a set of reference UEs, or a location of each of the set of reference UEs via at least one machine learning (ML) model, wherein the UE and the set of reference UEs include at least one common cell, wherein the at least one ML model is capable of identifying the at least one common cell between the UE and the set of reference UEs, and wherein an output of the at least one ML model includes a similarity score between the UE and the set of reference UEs, wherein the similarity score is on a per-cell basis.

* * * * *